United States Patent [19]

Huignard et al.

[11] 4,383,734

[45] May 17, 1983

[54] REAL-TIME OPTICAL CORRELATION SYSTEM

[75] Inventors: Jean-Pierre Huignard; Jean-Pierre Herriau; Laurence Pichon, all of Paris, France

[73] Assignee: Thomson-CSF, Paris, France

[21] Appl. No.: 204,050

[22] Filed: Nov. 4, 1980

[30] Foreign Application Priority Data

Nov. 5, 1979 [FR] France ............................... 79 27218

[51] Int. Cl.³ ........................... G03H 1/16; G02B 5/32

[52] U.S. Cl. .............................. 350/162.13; 350/3.61; 350/3.81; 365/123

[58] Field of Search ............... 350/162 SF, 3.64, 3.61, 350/3.62, 3.64, 3.81, 162.13; 365/120, 123

[56] References Cited

U.S. PATENT DOCUMENTS

| | | | |
|---|---|---|---|
| 3,519,992 | 7/1970 | Rau | 350/162 SF |
| 3,544,197 | 12/1970 | Weaver | 350/162 SF |
| 3,761,154 | 9/1973 | Shupe et al. | 350/3.62 |
| 3,812,496 | 5/1974 | Brooks | 350/162 SF |
| 4,138,189 | 2/1979 | Huignard et al. | 350/3.64 |
| 4,174,179 | 11/1979 | Tschudi et al. | 350/162 SF |

FOREIGN PATENT DOCUMENTS 2362466 3/1978 France ............................... 350/3.64

OTHER PUBLICATIONS

Weaver, C. S., & Goodman, J. W., "A Technique for Optically Convolving Two Functions", *Applied Optics*, vol. 5, No. 7, Jul. 1966, pp. 1248–1249.

*Primary Examiner*—Bruce Y. Arnold
*Attorney, Agent, or Firm*—Oblon, Fisher, Spivak, McClelland & Maier

[57] ABSTRACT

A correlation system providing the correlation function of two objects illuminated with coherent light by using the principle of double diffraction.

The correlation system of the invention is essentially characterized in that it uses as recording medium a plate of recyclable material, i.e. inscribable and erasable at will, such as bismuth-silicon oxide. The recording provided in the plate by superimposition of the beams illuminating the objects is read by a beam undergoing angular sweeping so as to optimize the diffraction efficiency for all the correlation peaks in the observation plane.

8 Claims, 7 Drawing Figures

REAL-TIME OPTICAL CORRELATION SYSTEM

BACKGROUND OF THE INVENTION

The invention relates to optical correlation systems for obtaining the correlation function of one image by another. Such systems allow, for example, a predetermined graphic symbol to be recognized in a composite pattern.

One known correlation method consists in recording on a photosensitive medium a system of interference fringes representing the diffraction figure provided by a lens which corresponds to two light beams in the path of which are placed respectively two objects with non-uniform transparency, generally the object to be analyzed and a reference object. This photosensitive medium is read by a reading beam and there is obtained, in the focal plane of a second lens, an intensity distribution characteristic in certain zones of the product of correlation between the two objects. In the case where the reference object bears a pattern which we seek to find again in the object to be analyzed, the object obtained is formed of peaks indicating the presence and the position of the reference pattern in the objects to be analyzed. This method of correlation has been tested with interference-fringe support media of photographic and thermoplastic types.

Such media require a chemical or heat treatment between the recording and reading phases, which involves a time lag between the two operations. Furthermore, they are generally not erasable. So they do not allow real-time operation.

SUMMARY OF THE INVENTION

The aim of the invention is to use the correlation method described above in real-time applications such as automatic reading, tracking of targets, guiding of missiles. To this end, the correlation system of the invention comprises a continuously recyclable photosensitive support medium, i.e. inscribable without development and erasable at will. Particularly suitable materials are electro-optical materials such as bismuth-silicon oxide, in which light-intensity spatial variations may be converted in real time into refraction-index spatial variations. Since the recording is carried out in volume and not on the surface, the optimum reading conditions are defined by Bragg's law which prescribes a distinct value of the reading angle for each spatial frequency recorded. Knowing that the correlation peaks are related to the spatial frequencies recorded, the invention provides angular sweeping of the reading beam for scanning the whole spectrum of the recorded spatial frequencies.

The present invention provides then an optical correlation system for obtaining the correlation function of a first object by a second, comprising means for illuminating the objects by means respectively of two coherent beams, first focusing means projecting in a focal plane (PF) an illumination representative of the algebraic sum of the Fourier transforms of the light amplitudes transmitted by the two objects respectively, a photosensitive support medium recording this illumination, other means for illuminating the photosensitive support medium, second focusing means projecting in a focal plane an illumination representative of the Fourier transform of the recorded illumination, and means for detecting the correlation peaks situated in a zone of the focal plane (P) characterizing the correlation function, wherein the photosensitive support medium is formed by a continuously recyclable material in which the recording forms a three-dimensional grating of fringes and the other means for illuminating the photosensitive support medium comprise angular sweep means ensuring optimum diffraction efficiency successively for the different points of the observed zone of the plane (P).

DESCRIPTION OF THE DRAWINGS

Other characteristics and advantages of the invention will appear in the following description, with reference to the accompanying figures in which.

DESCRIPTION OF THE PREFERRED EMBODIMENTS

Figure 1:
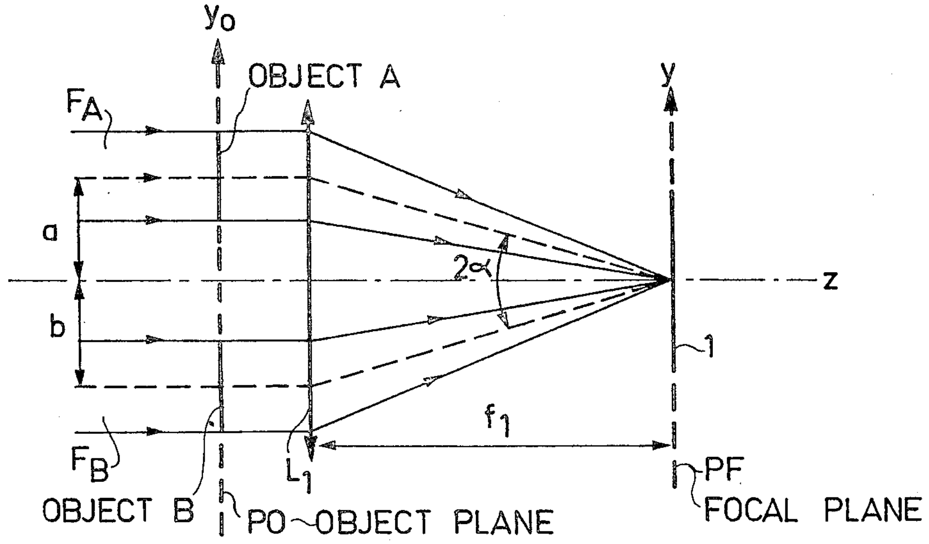
FIG.1 PRIOR ART
FIGS. 1 and 3 represent a known type of correlation system.
Figure 2:
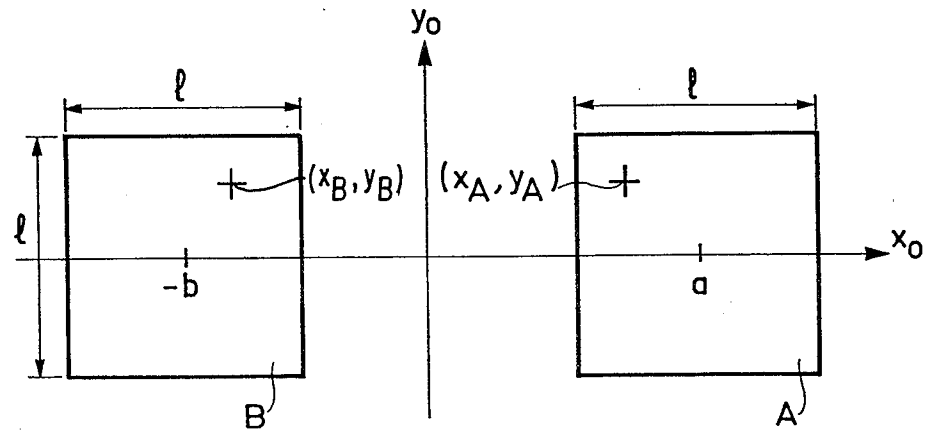
FIGS. 2 and 4 are figures for explaining the operation of the system shown in FIGS. 1 and 3.

FIG. 1 shows a known optical system for recording the algebraic sum of the Fourier transforms of two bidimensional functions. The two functions represent the transmittances of two objects A and B illuminated by parallel beams $F_A$ and $F_B$ which are contiguous or do not come from the same coherent source. The objects A and B are placed on each side of the optical axis z of a lens $L_1$ with a focal length f1, in the same plane PO perpendicular to this axis. In the focal plane PF of lens $L_1$, there is obtained an amplitude distribution proportional to the Fourier transform of the amplitude distribution in the object plane. A photographic or thermoplastic photosensitive support medium 1 placed in plane PF records the superimposition of intensity-fringe systems having different spacings, the average spacing $p_o$ being equal to $$\frac{\lambda_1}{2 \sin \alpha_o}$$

where $\lambda_1$ is the optical wavelength of beams $F_A$ and $F_B$ and $\alpha_o$ is the semi-angle between the axes of the two beams which interfere. The resulting intensity distribution along axes x, y of plane PF is proportional to the square of the module of the Fourier transform of the amplitude distribution in object plane PO. The positions of objects A and B in this plane are shown in FIG. 2. With $x_o$, $y_o$ the axes parallel to x, y in plane PO, we will call the centers of the two objects the respective coordinate points (a, o) and (−b, o), so that the transmittances of the two objects may be expressed in the form: $A(x_o-a, y_o)$ and $B(x_o+b, y_o)$. Their Fourier transforms may be written respectively: TA $e^{2\pi jax}$, TB $e^{-2\pi jbx}$, so that the intensity distribution in plane PF is written:

$$i(u, v) = //TA^2// + //TB^2// + TA^* \cdot TB e^{\frac{-2\pi j(a+b)x}{\lambda 1 f 1}} + TA \cdot TB^* e^{\frac{2\pi j(a+b)x}{\lambda 1 f 1}}$$

Figure 3:
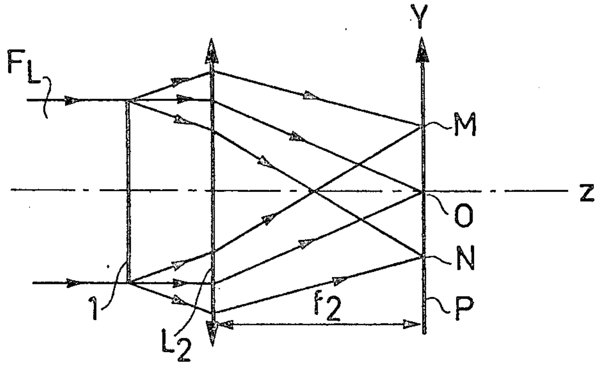
FIG.3 PRIOR ART

Once the recording on the photosensitive support medium is achieved, this latter may be subjected to the appropriate chemical or heat treatment, and then is read by the optical system shown in FIG. 3. The reading takes place by means of a coherent parallel beam $F_L$ illuminating the photosensitive support medium 1 under normal incidence. The different gratings recorded diffract beam $F_L$ through angles $\theta$ which depend on the spacing $$p: \sin\theta = \frac{\lambda_2}{2p}$$

where $\lambda_2$ is the wavelength of beam $F_L$.

A new Fourier transformation is effected by a second lens $L_2$ of focal length $f_2$. Thus there is obtained in its focal plane P with respect to axes X, Y parallel to axes x, y an intensity distribution I(X, Y) equal to the sum of three terms:

$$T_I = //A(kX, kY) \otimes A(kX, kY) + B(kX, kY) \otimes B(kX, kY)//^2$$

$$T_{II} = //A(k[X+a+b], kY) \otimes B(k[X+a+b], kY)//^2$$

$$T_{III} = //B(k[X-a-b], kY) \otimes A(k[X-a-b], kY)//^2$$

The sign $\otimes$ expresses the correlation product. k is the magnification ratio:

$$k = \frac{f_2}{f_1} \cdot \frac{\lambda_2}{\lambda_1}.$$

The correlation products of the two functions A and B are obtained centered about points M: (k(a+b), o) and N: (−k(a+b), o).

Figure 4:
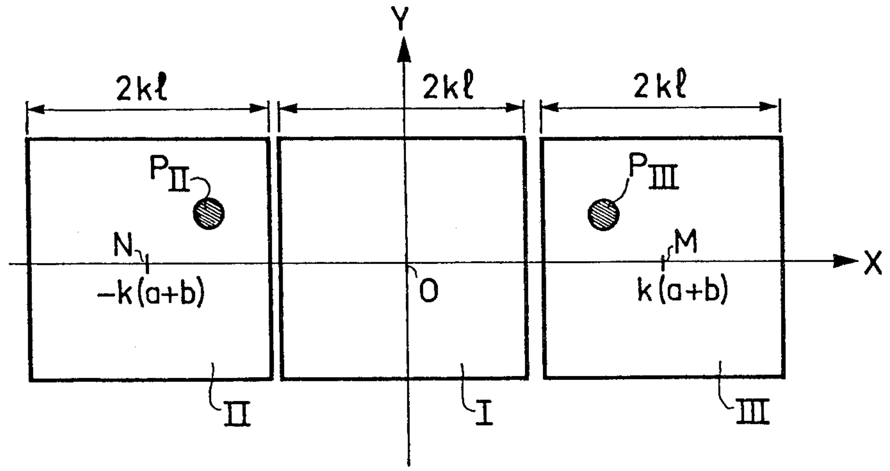

There is shown in FIG. 4 the limits of the images in the plane P of the three terms of the above expression: I, II, III in the case where, in plane PO, the two objects are squares with side l. Depending on the correlation between the two objects, there appear in plane P, which is that of the figure, light intensity peaks whose position is included in the frames shown, with side 2kl and is characteristic of the presence of the same signal in both objects. By way of example, the same pattern in the form of a cross, shown in plane PO in FIG. 2, occupies in the two objects the respective positions ($x_A$, $y_A$) and ($x_B$, $y_B$). To the presence of this signal there correspond in image plane P two intensity peaks $P_{II}$ and $P_{III}$ symmetrical with respect to the coordinate axis Y of the axes X, Y with peaks $P_{II}$ and $P_{III}$ being represented by $\pm k(x_A+x_B)$, $k(y_A+y_B)$. Because of the presence of the term $T_I$, whose image I is centered on the intersection O of axes X, Y, it is preferable, to avoid any superimposition of the three terms, for the distance equal to the quantity a+b between the centers of the objects is greater than their width 1. Of course, all that has been said for the direction x would be valid also for direction y, in the general case where the centers of objects A and B are not situated on axis x. In the description of the invention which follows, it will be assumed for simplicity's sake that a=b and that objects A and B are centered on axis x.

Figure 5:
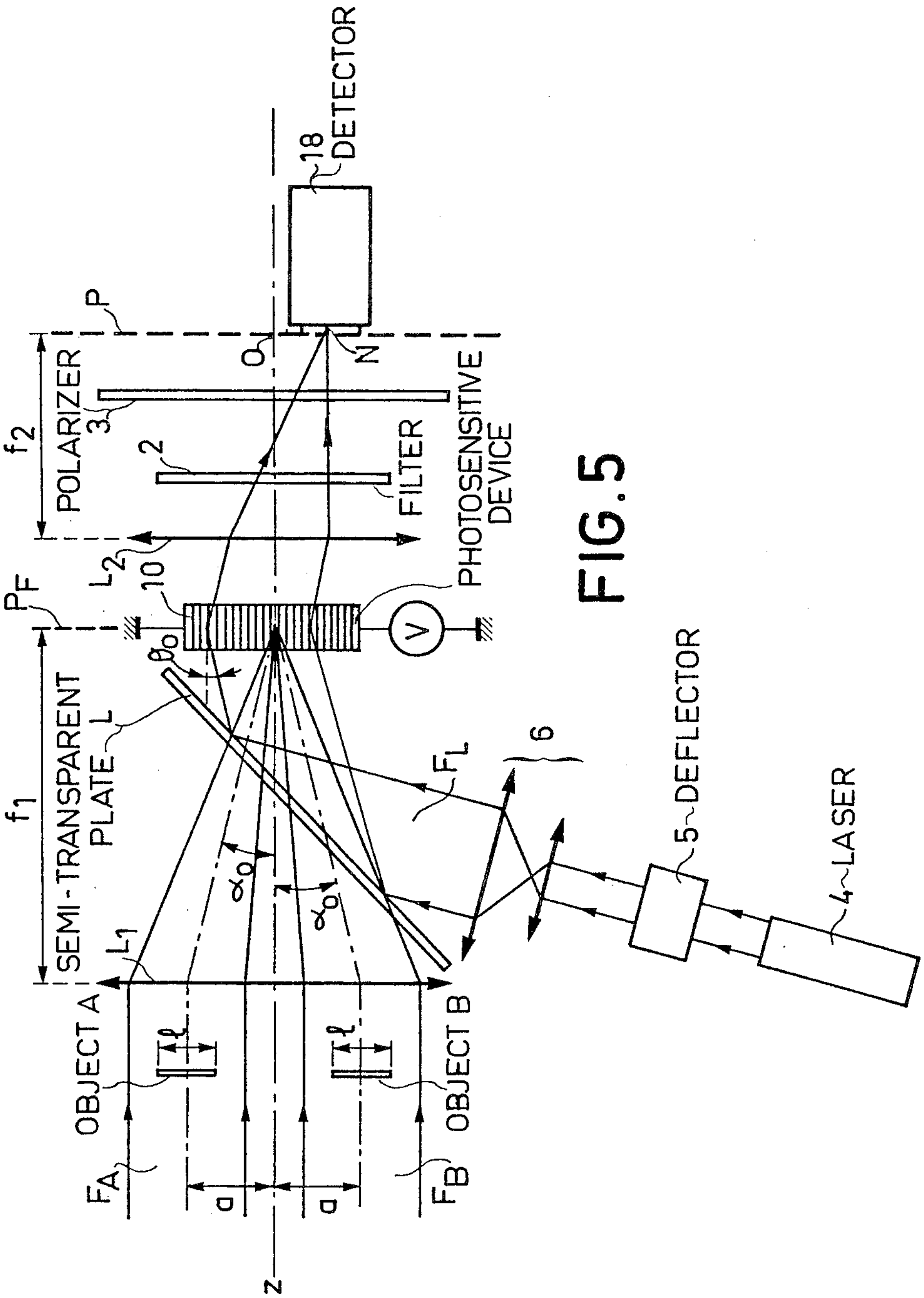
FIG. 5 shows one embodiment of the invention.

FIG. 5 shows one embodiment of the invention. A part of the elements of the correlation device are common with those of FIGS. 1 and 3 and bear the same reference numbers. The interference fringes resulting from the superimposition of beams $F_A$ and $F_B$ which illuminate objects A and B, after focusing provided by lens $L_1$ are recorded in a photosensitive device 10 centered on the image focal plane PF of lens $L_1$ and formed from an electro-optical material polarized by an electric field obtained by means of a voltage source V. Its orientation is such that the electric field produces a transverse electro-optical effect. The light-intensity spatial variations existing in plane PF cause, nearly instantaneously, refractive-index spatial variations in the photosensitive device, the interference planes being substantially perpendicular to the direction of the electric field applied. The index modulation disappears as soon as its cause, i.e. the presence of objects A and B in the path of the beams, disappears. Thus, there is obtained a real-time inscription, erasable at will. To obtain any information with maximum resolution, it is necessary for the thickness of the crystal to be equal to or greater than the width of the diffraction zone corresponding to the intersection of the diffraction ellipsoids of both beams $F_A$ and $F_B$ whose dimensions depend on the numerical aperture of lens $L_1$. A useful thickness may be defined, which is, in any case, substantially greater than the wavelength of the two beams so that recording in the photosensitive means may be considered as three-dimensional. It is a question of superimposition of surface gratings. When the width of the photosensitive means 10 in the direction perpendicular to the plane of the figure is not too great (typically of the same order of size as the thickness), these surfaces may be likened to planes perpendicular to the plane of the figure and whose spacing p and inclination ⅛ with respect to axis z depend on the angle of the rays which interfere, on the wavelength $\lambda_1$ and on the refractive index n of photosensitive device 10.

The materials usable for constructing the photosensitive devices 10 may be both photosensitive and electro-optical. Bismuth-silicon oxide ($Bi_{12}SiO_{20}$) and bismuth-germanium oxide ($Bi_{12}Ge\,O_{20}$) are particularly suitable for the invention because they are very sensitive in the range of wavelenthgths currently used (visible spectrum and infrared), and monocrystals can be obtained of sufficient dimensions (several cm) and having good optical qualities. Other materials might also be suitable but do not generally have such good optical qualities such as potassium niobate ($KNbO_3$), KTN, or SBN.

So as to obtain optimum efficiency in one of the diffraction orders during reading, it is advisable to comply with Bragg's condition. This condition defines, for each interference system, the angle between the collimated reading beam and the diffraction planes. Since this condition cannot be complied with simultaneously for all the systems which are superimposed, the invention provides angular sweeping of the reading beam $F_L$. This latter is supplied by a low-power laser 4 with a wavelength $\lambda_2$ chosen outside the range of wavelengths to which the material forming photosensitive device 10 is sensitive. Beam $F_L$ is deflected by a conventional acousto-optical or mechanical deflector 5 providing the angular sweeping in a way which will be described in more detail further on. Beam $F_L$ is shown in the figure in its average position, corresponding to a grating of planes parallel to z ($\phi=0$) of spacing $$p_o = \frac{\lambda_1}{3 \sin \alpha_o}.$$

It then passes through a beam-widener 6 and is fed by a semitransparent plate L to photosensitive device 10. The widening provided by widener 6 allows the whole of the recorded zone of photosensitive device 10 to be illuminated. The semitransparent plate L is interposed in the path of beams $F_A$ and $F_B$ and must be designed so as to let these beams pass. It inevitably introduces a phase shift, which is not troublesome for it is identical for both beams. The orientation with respect to photosensitive device 10 of the collimated reading beam is variable with respect to time and is controlled by deflector 5. After refraction by the second lens $L_2$ and after passing through a filter 2 and a polarizer 3, there is obtained in the focal plane P of lens $L_2$ correlation peaks similar to those obtained for example with a photographic plate. However, at any moment, for a given orientation, there are only obtained with maximum efficiency the points situated on a straight line perpendicular to the plane of the figure and with which may be associated an inclination $\phi$ and a plane-grating spacing p in photosensitive device 10 for which the incidence $\theta$ of the beam with respect to the planes is Bragg's incidence: defined by $$\sin\theta = \frac{\lambda_2}{2p}.$$

There are also obtained with reduced efficiency the adjacent points for which the incidence is included in a range $$\delta\phi = \frac{np}{d}$$

where n is the refractive index of photosensitive device 10 and d the thickness of the effective diffraction zone in photosensitive device 10. So as to examine the whole of the zone III (or II) centered about point N (or M), the whole corresponding angular area must be swept. All the correlation peaks thus appear sequentially.

The detection of the correlation peaks is effected with means 18 such as, for example, a mosaic of detectors or a vidicon tube connected to a television system. In this latter case, the sweep speed of the reading beam is advantageously equal to the television sweep speed.

By way of non-limiting example, the device has been constructed with a monocrystalline photosensitive device of bismuth-silicon oxide having a length of 2 mm and a thickness of 1 mm polarized by a voltage $V_o$ of the order of 2000 V, which provides an electric field of the order of 10 kV/cm$^1$, the wavelength of the illuminating beams $\lambda$ was 0.5 $\mu$m, which corresponds to a good sensitivity of the crystal. The reading beam $F_L$ came from a Helium-Neon laser with a power of a few mW and a wavelength $\lambda_2 = 0.6$ $\mu$m.

The focal length of lens $L_1$ was 30 cm and that of lens $L_2$ 10 cm. The magnification k was then equal to 0.4.

The objects were slides of dimensions 2 cm$\times$2 cm. The extent of each zone II and III was thus 0.8$\times$0.8 cm, observable with a vidicon tube whose diameter is typically 1.5 cm. Instead of using the HeNe laser, a semiconductor laser may be used with a wavelength 0.8 $\mu$m.

Figure 6:
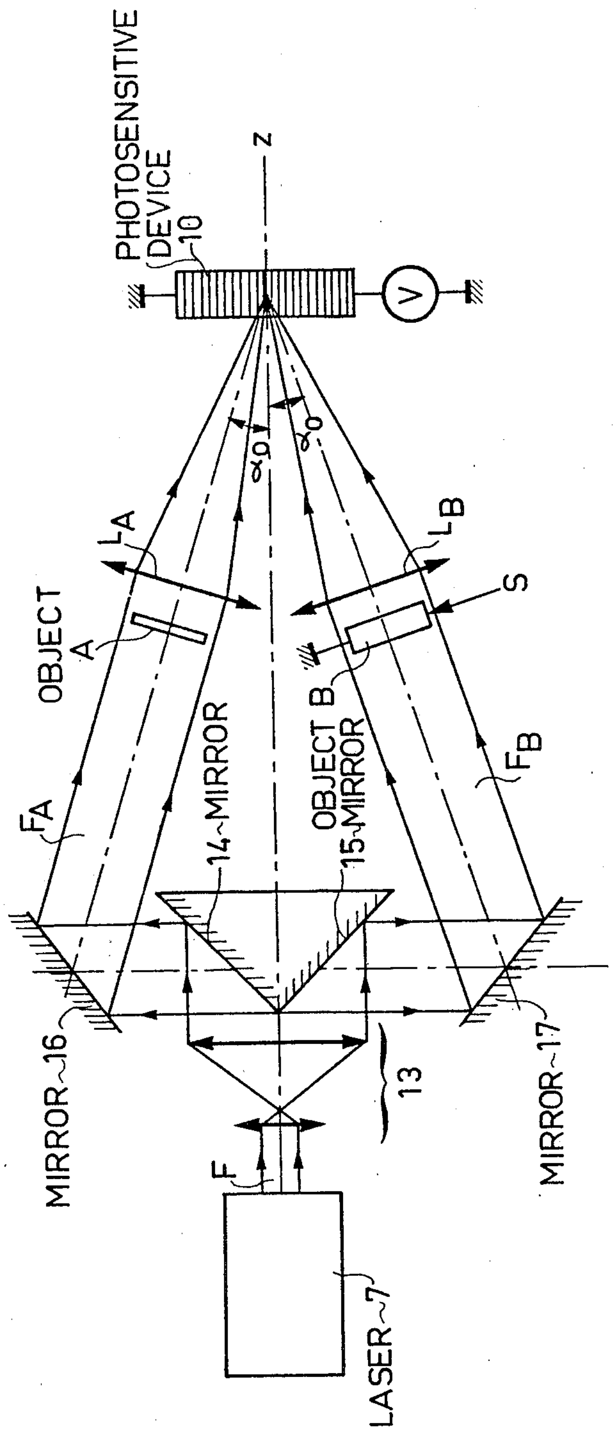
FIGS. 6 and 7 show other embodiments of the invention.

The system shown in FIG. 5 admits of numerous variations, particularly insofar as the means supplying beams $F_A$, $F_B$, $F_L$, the means for detecting the correlation peaks obtained in plane P and the respective position of the different optical elements are concerned. FIG. 6 shows another embodiment concerning the means supplying beams $F_A$ and $F_B$. It avoids the use of a wide-aperture lens $L_1$. In fact, in accordance with the preceding embodiment, with the width of the objects typically 2 or 3 cm and the distance between their centers at least equal to this value, the diameter required for lens $L_1$ reaches approximately 10 cm. According to the proposed variation, lens $L_1$ is replaced by two lenses $L_A$ and $L_B$, smaller since their dimensions correspond to those of objects A and B and whose optical axes merge respectively with the axes of beams $F_A$ and $F_B$ which are no longer parallel but each form with respect to axis z an angle$\pm\alpha o$, which remains unchanged after the lenses. Beams $F_A$ and $F_B$ come from a single beam delivered by a laser 7, an argon laser for example, after widening in a widener 13 and separation and reflection by mirrors 14, 15, 16, 17. Objects A and B are centered with respect to the respective axes of the two beams. The correlation system is shown in the case of its application for target tracking; object A is the reference object. It is, for example, formed by a slide representing a fixed landscape. Object B carries a variable pattern. It is formed by an electro-optical modulator controlled by a signal S coming, for example, from a television camera aimed at the object to be tracked. The correlation system allows the coincidence between the sighted landscape and the fixed landscape to be detected.

Figure 7:
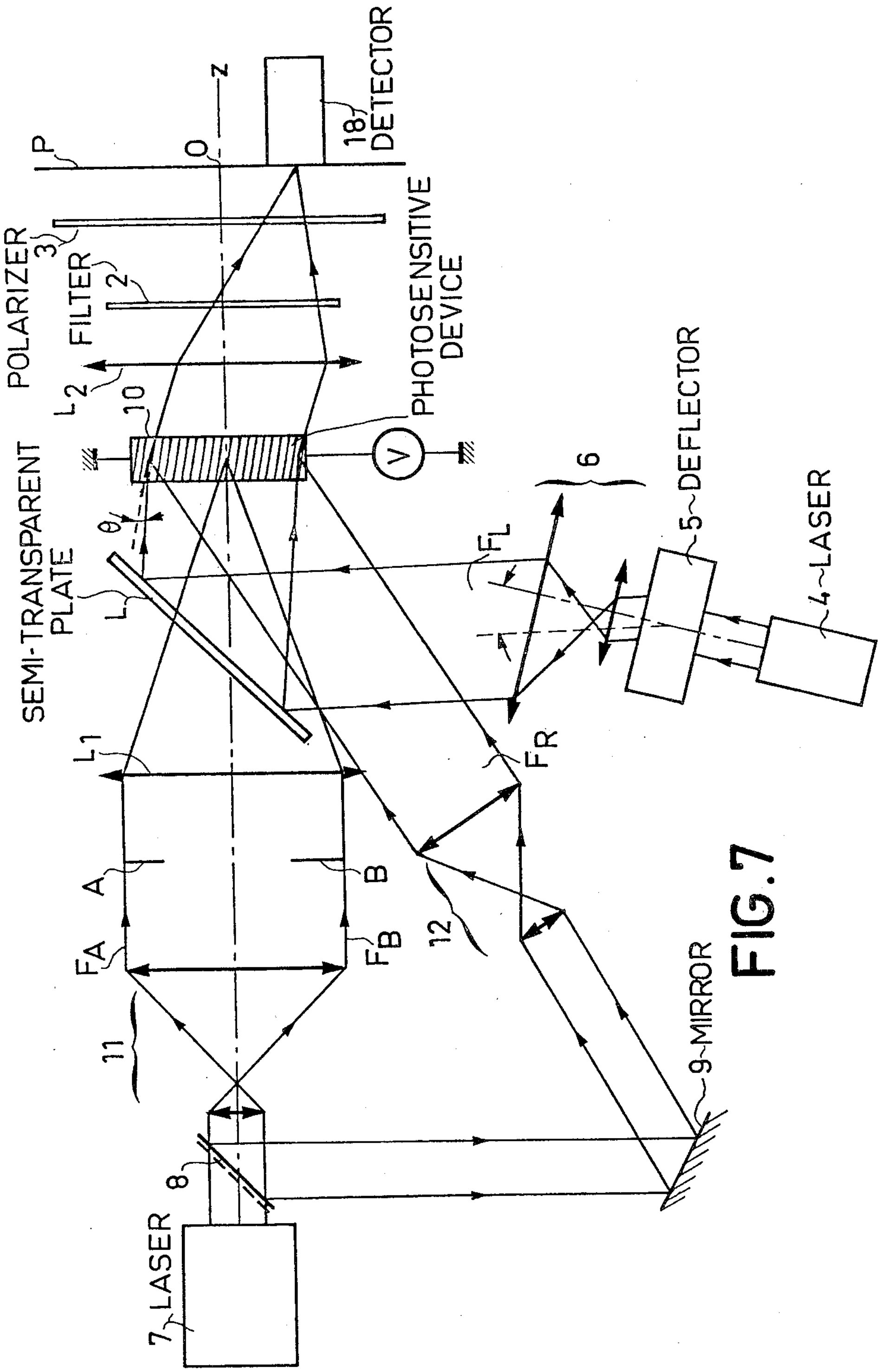

To obtain improved linearity in the response of the electro-optical crystal, it may be advantageous to create a constant modulation level by means of a reference light beam similar to that present in a conventional holographic system. The illumination due to this reference beam creates a first spatially unmodulated index variation, to which are added the variations due to the interference systems due to the beams illuminating objects A and B. Additional interference systems are formed but it can be arranged, by suitably choosing the inclination of the reference beam, for the reflected rays which result therefrom to be substantially outside the examined zones, centered about I and J. One embodiment of the system in which a constant index modulation level is created is shown in FIG. 7. The reference beam $F_R$ comes from the same source 7 as beams $F_A$ and $F_B$. A semireflecting plate 8 and a mirror 9 allow beam $F_R$ to be separated. Beams $F_A$ $F_B$ on the one hand and $F_R$ on the other are widened by means of wideners 11 and 12. The rest of the system is similar to that of FIG. 5 or of one of the variations thereof.

What is claimed is:

1. An optical correlation system for obtaining the correlation function of a first object by a second one, comprising means for illuminating the objects by means respectively of two coherent beams, first focusing means projecting in a first focal plane (PF) an illumination having an intensity substantially proportional to the algebraic sum of the Fourier transforms of the light amplitudes transmitted by the two objects respectively, a photosensitive support medium situated in the first focal plane (PF), recording this illumination in real time and formed from a continuously recyclable material in which the recording forms a three-dimensional grating of fringes, other means for illuminating the photosensitive support medium, second focusing means projecting in a second focal plane (P) an illumination having an intensity substantially proportional to the Fourier transform of the recorded illumination, and means for detecting correlation peaks situated in a zone of the second focal plane (P) and characterizing the correlation function, wherein said other means for illuminating said photosensitive support medium comprise angular sweep means ensuring optimum diffraction efficiency successively for the different points of the observed zone of said second focal plane (P).

2. The optical correlation system as claimed in claim 1, wherein said means for illuminating the objects comprise a laser and optical means providing two beams parallel to the axis of the lenses on each side of this axis, said objects being respectively centered on the axes of said two beams.

3. The optical correlation system as claimed in claim 1, wherein said means for lighting the objects comprise a laser and means for separating the laser beam and thus providing two collimated beams whose axes form therebetween a predetermined angle and intersect adjacent the center of said photosensitive support medium, said first focusing means being formed by two spherical lenses whose axes coincide respectively with the axes of the two beams and whose focal points coincide with the meeting point of these axes, said objects being respectively centered on the axes of said two beams.

4. The optical correlation system as claimed in claim 1, wherein said other means for illuminating the photosensitive support medium comprise a laser.

5. The optical correlation system as claimed in claim 1, wherein said photosensitive support medium is a bismuth-silicon oxide monocrystalline photosensitive device.

6. The optical correlation system as claimed in claim 1, wherein said photosensitive support medium is a bismuth-germanium oxide monocrystalline photosensitive device.

7. The optical correlation system as claimed in claim 1, wherein said photosensitive support medium is polarized by an electric field obtained by means of a voltage source.

8. The optical correlation system as claimed in claim 1, wherein there are further provided third means for illuminating said photosensitive support medium for creating in this photosensitive support medium a constant modulation level superimposed on the three-dimensional fringe grating which corresponds to the recording of the illumination representative of the algebraic sum of the Fourier transforms of the light amplitudes transmitted by both objects.

* * * * *